US007532368B2

(12) United States Patent
Ben-David et al.

(10) Patent No.: US 7,532,368 B2
(45) Date of Patent: May 12, 2009

(54) AUTOMATED PROCESSING OF PAPER FORMS USING REMOTELY-STORED FORM CONTENT

(75) Inventors: Shay Ben-David, Haifa (IL); Amir Geva, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 11/550,552

(22) Filed: Oct. 18, 2006

(65) Prior Publication Data

US 2008/0144106 A1      Jun. 19, 2008

(51) Int. Cl.
    *G06K 15/00* (2006.01)
(52) U.S. Cl. ....................................... 358/403; 382/306
(58) Field of Classification Search ................. 358/403; 382/305, 306, 317, 312, 175
    See application file for complete search history.

(56) References Cited

U.S. PATENT DOCUMENTS

| 5,060,980 | A | * | 10/1991 | Johnson et al. | 283/70 |
| 5,241,464 | A | * | 8/1993 | Greulich et al. | 705/26 |
| 5,754,308 | A |   | 5/1998 | Lopresti et al. | |
| 5,757,959 | A | * | 5/1998 | Lopresti | 382/186 |
| 6,426,806 | B2 | * | 7/2002 | Melen | 358/468 |
| 7,289,685 | B1 | * | 10/2007 | Wolff et al. | 382/317 |
| 2005/0231746 | A1 | * | 10/2005 | Parry et al. | 358/1.13 |
| 2007/0097448 | A1 | * | 5/2007 | Iizuka | 358/403 |

OTHER PUBLICATIONS

Intelligent Forms Processing (IFP)IBM Corp. Available at: www2.clearlake.ibm.com/GOV/ifp/ 2006.
Digital Mailroom—details at: www.captivasoftware.com/products/digitalMailroom.asp 2006.
Gingrande, A. "From E-forms to X-forms" 2006,Available at: http://www.aiim.org/article-aiim.asp?ID=31261.
Adobe LiveCycle—details at: www.adobe.com/uk/products/server/barcodedpaperforms 2006.

* cited by examiner

*Primary Examiner*—Kimberly A Williams

(57) ABSTRACT

A computer-implemented method for processing paper forms includes capturing at a computer system an image of a paper form in which information has been filled-in. A location identifier is extracted from the image. The location identifier indicates an address in a storage location external to the computer system, at which the filled-in information is electronically stored. The information is retrieved responsively to the location identifier by communication with the storage location via a wide area network (WAN), so as to convey the information electronically from the storage location to the computer system. The information is processed using a data processing application running on the computer system.

8 Claims, 2 Drawing Sheets

AUTOMATED PROCESSING OF PAPER FORMS USING REMOTELY-STORED FORM CONTENT

FIELD OF THE INVENTION

The present invention relates generally to form processing systems, and particularly to methods and systems for automated processing of paper forms using remotely-stored content.

BACKGROUND OF THE INVENTION

Many types of organizations use forms to acquire data from clients in order to provide services and run their business. Such organizations typically deploy computerized databases and other computerized systems for storing and otherwise processing the information conveyed in the forms. Typically, such systems process large numbers of forms and convert them into computer-readable information.

Some applications use paper forms that are filled in and submitted by clients. For example, IBM Corp. (Armonk, N.Y.) offers an Intelligent Forms Processing (IFP) system, which automates data capture from large numbers of paper forms. Additional details regarding the IFP system are available at www2.clearlake.ibm.com/GOV/ifp/. Another paper form processing system called "Digital Mailroom" is offered by the EMC Corporation (Hopkinton, Mass.). Further details regarding this product are available at www.captivasoftware.com/products/digitalMailroom.asp.

In some methods and systems, an encoded description of the form information is printed on the paper form. For example, U.S. Pat. No. 5,060,980 describes a form including user-modifiable fields and an encoded description of the location, size, and type of the fields, which allows direct programming of a form interpreter. Other information including the processing of the form, encoded data, etc., may be included in the encoded information. As another example, Adobe, Inc. (Uxbridge, United Kingdom), offers a product called Adobe® LiveCycle™ Barcoded Forms, which encodes form information in a two-dimensional barcode embedded in the form. Further details regarding this product are available at www.adobe.com/uk/products/server/barcodedpaperforms.

Some known methods and systems archive a digital representation of a document. For example, U.S. Pat. No. 5,754,308 describes a system for encoding, printing, retrieving and archiving pages of documents. Document information designators are encoded for pages. Each designator includes information regarding the location of the digital representation of the page and optionally includes page generation and reproduction information. An enhanced copier or facsimile machine scans the printed designator, retrieves the stored digital representation of the page and outputs a "subsequent original" of the page.

SUMMARY OF THE INVENTION

There is therefore provided, in accordance with an embodiment of the present invention, a computer-implemented method for processing paper forms. The method includes capturing, at a computer system, an image of a paper form in which information has been filled-in. A location identifier is extracted from the image. The location identifier indicates an address in a storage location external to the computer system, at which the filled-in information is electronically stored. The information is retrieved responsively to the location identifier by communication with the storage location via a wide area network (WAN), so as to convey the information electronically from the storage location to the computer system. The information is processed using a data processing application running on the computer system.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for processing paper forms. In some embodiments, an originating party fills in a form with information and prints a filled-in paper form. The paper form is then provided to a receiving party. The originating party stores the filled-in form information in digital storage media in a storage location, which is accessible to the receiving party. In order to enable the receiving party to access the stored information, a machine-readable location identifier, which uniquely points to the location in which the form information is stored, is embedded in the printed paper form.

The receiving party accepts and captures an image of (e.g., scans) the paper form. A form processor processes the captured image, and in particular extracts and decodes the embedded location identifier. Based on this identifier, the form processor communicates with the storage location and retrieves the form information that was filled into the form, rather than extracting the filled-in information from the captured image of the paper form. In some embodiments, privacy and security measures are taken in order to allow only authorized parties to retrieve respective form information.

The methods and systems described herein improve the accuracy and efficiency of paper form processing, since they relieve the receiving party of the need to extract the form information from the scanned form itself. Such extraction can be a complicated and error-prone process and may require significant human intervention. Using the methods and systems disclosed herein, paper forms can be processed regardless of their formats and templates, which may be unknown to the receiving party and/or vary over time. Unlike some known form processing methods, the methods and systems described herein do not require form-specific training of the form processing system, which is often a tedious, error-prone and labor-intensive process. Since the printed paper forms described herein comprise conventionally-printed form fields as well as the embedded location identifier, however, the forms are backward-compatible with conventional form processing applications.

System Description

Figure 1:
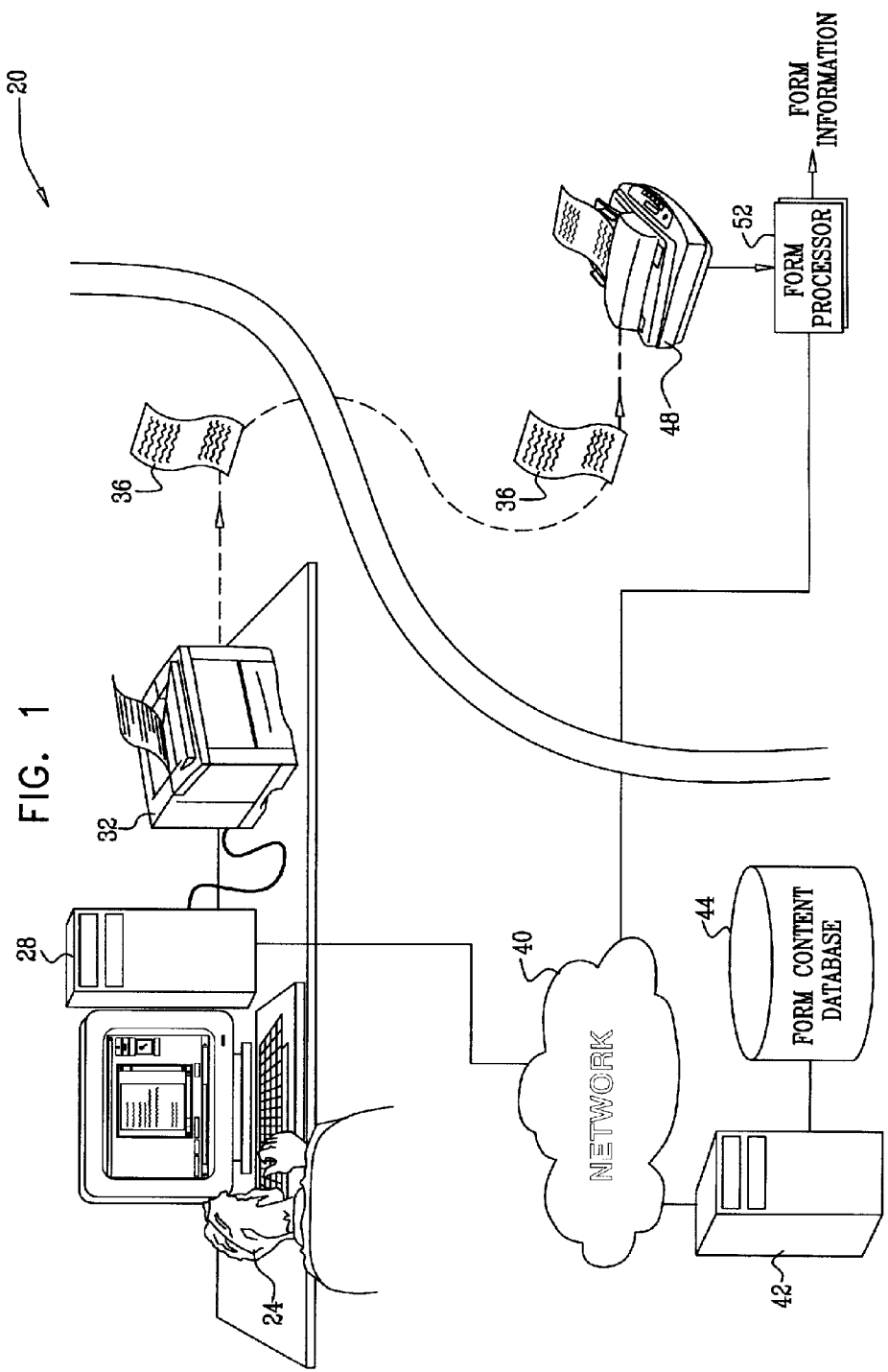
FIG. 1 is a block diagram that schematically illustrates a form processing system, in accordance with an embodiment of the present invention.

FIG. 1 is a block diagram that schematically illustrates a paper form processing system 20, in accordance with an embodiment of the present invention. The paper forms are filled-in with information and produced by an originating party, and are received and processed by a receiving party.

Typically but not necessarily, the originating and receiving parties comprise different organizations. Systems of this sort may be used, for example, by companies that issue invoices and receipts to customers and suppliers.

In a typical transaction, a user 24 in the originating party fills a form electronically with information using a workstation 28. The filled-in form is printed using an output device, such as a printer 32, to produce a filled-in paper form 36. Form 36 may comprise, for example, a receipt, an invoice, an application form, an order form or any other suitable form.

At the receiving party, filled-in paper form 36 is captured by a capture device, such as a scanner 48, which produces a computer-readable representation of the form. The representation may comprise, for example, an image file. The scanned form image is then processed by a form processor 52, which extracts the filled-in information. Processor 52 may apply any suitable image processing and/or optical character recognition (OCR) methods for this purpose. The extracted information is typically provided to a data processing application (not shown) of the receiving party. The data processing application may comprise, for example, an enterprise resource planning (ERP) system.

The information entered in the forms is stored electronically by the originating party in a storage location, which is accessible to the receiving party. For example, in the configuration of FIG. 1, the information of the different filled-in paper forms is stored by workstation 28 in a form content database 44. Database 44 is accessible to form processor 52 over a wide area network (WAN) 40, such as the Internet. In some embodiments, database 44 is part of a content manager or web-server 42 operated by the originating party or by a third party.

The form information is typically stored in database 44 as a metadata object, such as an extensible markup language (XML) object. Alternatively, any other suitable data structure or representation can be used. Typically, database 44 holds a large number of metadata objects corresponding to the filled-in paper forms produced by the originating party.

When producing each filled-in paper form by the originating party, workstation 28 embeds a location identifier in the printed paper form. The location identifier indicates the location (e.g., network address) from which the form information can be retrieved. For example, the location identifier may comprise a universal resource locator (URL) pointing to the location of the form information in database 44. Alternatively, the location identifier may comprise any other type of uniform resource identifier (URI), a uniform naming convention (UNC) identifier, or any other suitable identifier that uniquely maps to the location in which the form information is stored.

In some embodiments, the location identifier is printed as textual information on the filled-in form. The textual information may be printed in an OCR-friendly manner in order to improve its decoding reliability. For example, the textual information may be printed in a designated area of the form using large and clear fonts and/or using a limited-size alphabet. Alternatively, the location identifier may be printed using a suitable machine-readable graphical symbol, such as a one-dimensional or two-dimensional barcode.

When analyzing the scanned form, form processor 52 extracts and decodes the location identifier from the form. The form processor communicates with database 44 over network 40 and retrieves (i.e., conveys electronically) the information stored at the location identified by the location identifier. Assuming the information is retrieved successfully from database 44, no further analysis or processing of the information printed on the form is typically necessary, and processor 52 may output the retrieved information.

If processor 52 is unable to obtain the remotely-stored information, it may revert to extracting the information from the form itself, using any suitable method. The form processor may be unable to obtain the information, for example, when the location identifier is not found or is not decoded successfully, or when the information is not found at the indicated location. In some cases, processor 52 may retrieve only part of the form information from database 44, and extract other parts of the information from the paper form itself. Combining the two techniques may be used, for example, when gradually introducing the automated processing methods described herein.

In some embodiments, security and privacy measures are taken in order to prevent unauthorized access to the information stored in database 44. Typically, database 44 allows access to the information of a particular form only after verifying that the accessing party has been granted permission to access this information. For example, each form entry in database 44 may comprise an access control list (ACL), which specifies the parties (e.g., organizations) having access privileges to the entry. Each legitimate party is typically assigned a user ID and password, which are pre-coordinated and distributed using any suitable method.

Alternatively, controlled access can be implemented by using a mapping function between the location identifier printed on the form and the actual storage location, wherein the function is known only to authorized users. For example, in some embodiments the location identifier printed on the form comprises a code having a large number of characters. The location identifiers are uniquely mapped to storage addresses using a hashing function, which is disclosed only to authorized parties. When a sufficiently long URL is used, the URL itself may be hashed instead of a code.

In some embodiments, an image file of the filled-in form may be stored in database 44 along with the form information. The image file may be stored using any suitable format, such as the portable document format (PDF). The stored image may be used by the receiving party since this image may have a better quality than the image produced by capture device 48. For example, the paper form may have been folded, stained, stapled or otherwise corrupted before it was scanned by device 48. As another example, device 48 may produce black and white images, whereas the image stored in database 44 may be in color. Since the image file stored in database 44 is generated directly from the form information, it is typically much smaller in size than the scanned image.

In some embodiments, a template that describes the layout and structure of the form may also be stored in database 44 along with the form information. Some aspects of using remotely-stored form templates are described, for example, in U.S. patent application Ser. No. 11/325,039 entitled "Automated Processing of Paper Forms Using Remotely-Stored Templates," filed Jan. 4, 2006, which is assigned to the assignee of the present patent application.

In some embodiments, a servlet can be used for reconstructing and producing an image of the filled-in form "on demand" from the retrieved information. The servlet may run on server 42 or on form processor 52.

Typically, form processor 52 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, some elements of processor 52 may be implemented using hardware or using a combination of hardware and software elements.

Figure 2:
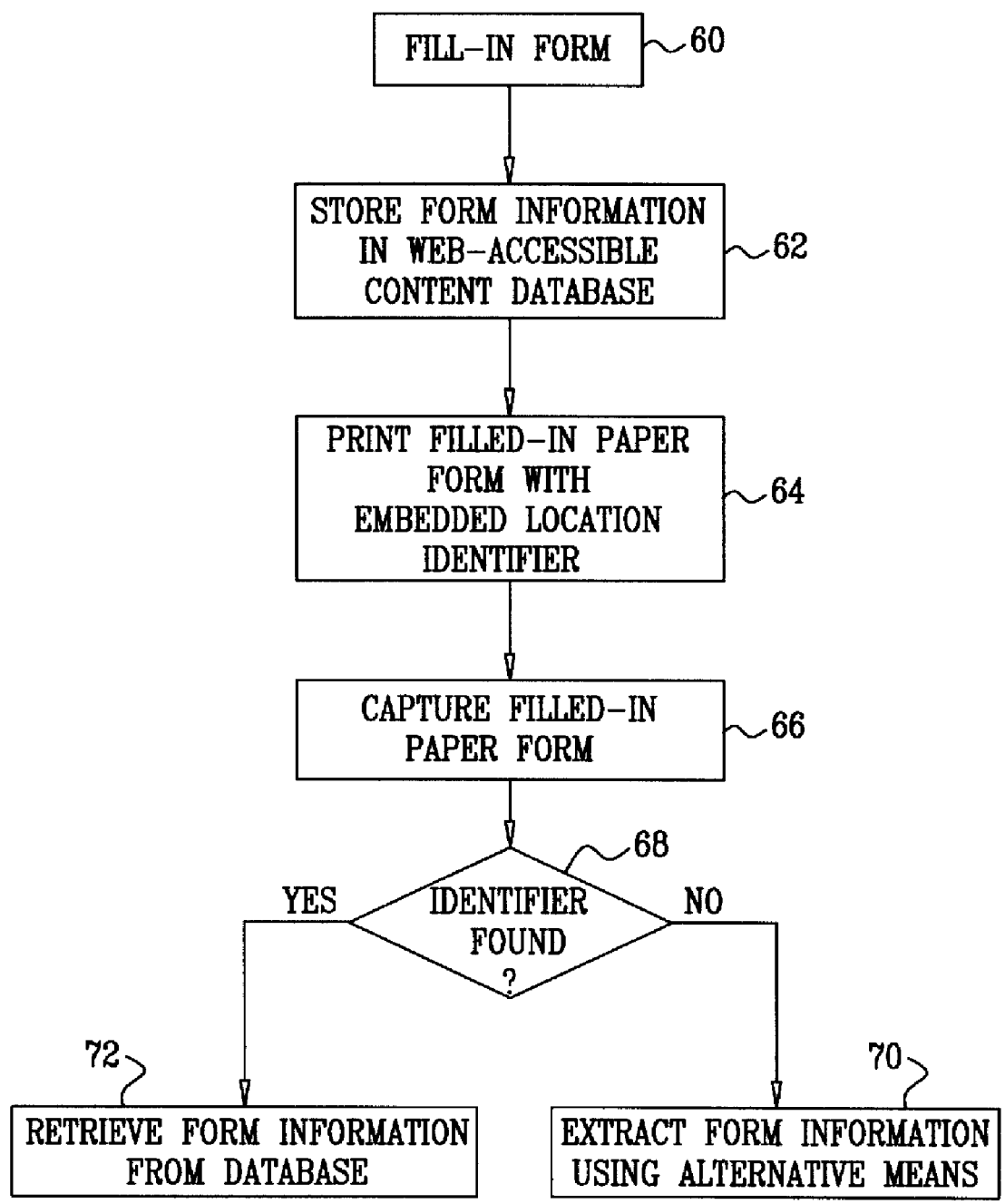
FIG. 2 is a flow chart that schematically illustrates a method for processing paper forms, in accordance with an embodiment of the present invention.

FIG. 2 is a flow chart that schematically illustrates a method for processing paper forms, in accordance with an embodiment of the present invention. The method begins with the originating party entering information into a form using workstation 28, at a paper form production step 60. The originating party, in the present example workstation 28, stores the form information in database 44, at a remote storage step 62. The originating party produces a paper form having the information printed thereon, at a printing step 64. In order to enable access to the information, workstation 28 embeds a location identifier in the printed form.

The filled-in paper form is provided to the receiving party using any suitable method, such as by mail, fax or in person. Capture device 48 scans the filled-in paper form, at a capturing step 66. Form processor 52 attempts to locate and extract the embedded location identifier, at an identifier checking step 68.

If processor 52 is unable to successfully extract the location identifier, processor 52 extracts the form information from the scanned form image, at an information extraction step 70. The processor may use any suitable image processing and/or OCR method for extracting the information from the image.

If, on the other hand, form processor 52 successfully extracts the location identifier printed on the form, the processor retrieves the form information from the appropriate location in database 44, at an information retrieval step 72. Typically, the form processor derives the location in which the form information is stored from the location identifier and communicates with database 44 over network 40, so as to retrieve the information. As noted above, the form processor should possess the appropriate privileges to access the information, and database 44 may verify these privileges before allowing the information to be retrieved.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method, comprising:
receiving information that was filled electronically into fields of a form by a user;
representing the information that was filled into the form by a metadata object, and storing the metadata object in a storage location in a first computer system;
printing a filled-in paper form, which comprises the fields, the information that was filled into the form by the user, and a location identifier that is indicative of an address of the storage location at which the metadata object representing the filled-in information is stored;
at a second computer system, which is separated from the first computer system, capturing an image of the printed filled-in paper form;
extracting the location identifier from the captured image;
retrieving the metadata object responsively to the location identifier, so as to convey the filled-in information from the storage location to the second computer system without extracting the filled-in information from the captured image; and
processing the retrieved information using a data processing application running on the second computer system.

2. The method according to claim 1, wherein the location identifier is printed on the paper form using textual characters, and wherein extracting the location identifier comprises identifying the textual characters using optical character recognition (OCR).

3. The method according to claim 1, wherein the location identifier is encoded in a computer-readable graphical symbol printed on the paper form, and wherein extracting the identifier comprises decoding the identifier from the symbol.

4. The method according to claim 1, and comprising, when failing to retrieve the metadata object responsively to the location identifier, extracting the filled-in information from the captured image.

5. The method according to claim 1, wherein retrieving the metadata object comprises verifying a privilege to access the filled-in information.

6. The method according to claim 5, wherein verifying the privilege comprises verifying that a user identity associated with the second computer system appears in an access control list (ACL), which is stored in the storage location and defines user identities having the privilege.

7. The method according to claim 5, wherein verifying the privilege comprises mapping the location identifier to the address in the storage location using a mapping function, which is disclosed to users having the privilege.

8. The method according to claim 1, wherein retrieving the metadata object comprises retrieving an electronically-stored image of the paper form.

* * * * *